US012035076B2

(12) United States Patent
Guibene et al.

(10) Patent No.: US 12,035,076 B2
(45) Date of Patent: Jul. 9, 2024

(54) METHOD AND APPARATUS FOR REAL-TIME GUNSHOT DETECTION AND REPORTING

(71) Applicant: Charter Communications Operating, LLC, St. Louis, MO (US)

(72) Inventors: Wael Guibene, Parker, CO (US); Hossam Hmimy, Aurora, CO (US); Manish Jindal, Lone Tree, CO (US); Patricia Zullo, Indio, CA (US); Satyanarayana Parimi, Cos Cob, CT (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/997,678

(22) Filed: Aug. 19, 2020

(65) Prior Publication Data

US 2022/0060663 A1 Feb. 24, 2022

(51) Int. Cl.
| | | |
|---|---|---|
| *H04N 7/18* | (2006.01) | |
| *G01S 19/17* | (2010.01) | |
| *G01V 1/00* | (2006.01) | |
| *G06V 20/52* | (2022.01) | |
| *G06V 40/16* | (2022.01) | |
| *G08B 17/08* | (2006.01) | |
| *H04N 23/66* | (2023.01) | |

(52) U.S. Cl.
CPC ............ *H04N 7/181* (2013.01); *G01S 19/17* (2013.01); *G01V 1/001* (2013.01); *G06V 20/52* (2022.01); *G06V 40/168* (2022.01); *G08B 17/08* (2013.01); *H04N 23/66* (2023.01)

(58) Field of Classification Search
None
See application file for complete search history.

(56) References Cited

U.S. PATENT DOCUMENTS

| | | | |
|---|---|---|---|
| 9,753,119 B1* | 9/2017 | Velusamy | G01S 5/18 |
| 10,914,811 B1* | 2/2021 | Wild | H04M 11/025 |
| 2017/0301220 A1* | 10/2017 | Jarrell | H04W 4/38 |
| 2018/0003756 A1* | 1/2018 | Zhang | G01V 3/088 |
| 2018/0040241 A1* | 2/2018 | Leblond | G06T 17/05 |
| 2018/0050800 A1* | 2/2018 | Boykin | H04B 7/18506 |
| 2019/0347920 A1* | 11/2019 | Anderson | G08B 13/1672 |
| 2020/0226892 A1* | 7/2020 | Coles | G08B 5/38 |
| 2020/0334448 A1* | 10/2020 | Ghazaryan | G06K 9/00201 |
| 2021/0063120 A1* | 3/2021 | Taveniku | G06K 9/00771 |

OTHER PUBLICATIONS

Author Unknown, "ShotSpotter Technology," https://www.shotspotter.com/technology/, accessed May 21, 2020, 6 pages.

* cited by examiner

*Primary Examiner* — James M Anderson, II
(74) *Attorney, Agent, or Firm* — Dority & Manning, P.A.

(57) ABSTRACT

Real-time gunshot detection and reporting. A computing device detects, in an audio signal received by an audio receiver that includes a plurality of audio receiving elements, at least one gunshot. The computing device determines, based on the plurality of audio receiving elements, an audio location of the at least one gunshot. The computing device sends control signals to at least two cameras to cause the at least two cameras to capture at least two corresponding images of the audio location. The computing device, based on the at least two corresponding images, identifies a gunshot location and transmits a gunshot location identifier that identifies the gunshot location to a destination.

16 Claims, 10 Drawing Sheets

| | |
|---|---|
| 170-1 | TIME OF FIRST GUNSHOT |
| 170-2 | GPS COORDINATES OF GUNSHOT LOCATION |
| 170-3 | IMAGE OF GUNSHOT LOCATION |
| 170-4 | FACIAL IMAGE |
| 170-5 | GUN IMAGE |
| 170-6 | URI TO LIVE VIDEO OF GUNSHOT LOCATION |
| 170-7 | URI TO RECORDED VIDEO OF GUNSHOT LOCATION |
| 170-8 | GUN TYPE AND PROBABILITY |
| 170-9 | RATE OF FIRE |
| 170-10 | NUMBER OF GUNSHOTS DETECTED |

METHOD AND APPARATUS FOR REAL-TIME GUNSHOT DETECTION AND REPORTING

BACKGROUND

Municipalities and law enforcement organizations use technology to increase their awareness of and responsiveness to mass shootings and other types of gun violence.

SUMMARY

The embodiments disclosed herein include methods and systems for detecting and reporting gunshots.

In one embodiment, a method is provided. The method includes detecting, in an audio signal received by an audio receiver comprising a plurality of audio receiving elements, at least one gunshot. The method further includes determining, based on the plurality of audio receiving elements, an audio location of the at least one gunshot. The method further includes sending control signals to at least two cameras to cause the at least two cameras to capture at least two corresponding images of the audio location. The method further includes, based on the at least two corresponding images, identifying a gunshot location. The method further includes transmitting a gunshot location identifier that identifies the gunshot location to a destination.

In another embodiment a gunshot detection system is provided. The gunshot detection system includes a communications interface and a processor device coupled to the communications interface. The processor device is configured to detect, in an audio signal received by an audio receiver comprising a plurality of audio receiving elements, at least one gunshot. The processor device is further configured to determine, based on the plurality of audio receiving elements, an audio location of the at least one gunshot. The processor device is further configured to send control signals to at least two cameras to cause the at least two cameras to capture at least two corresponding images of the audio location. The processor device is further configured to, based on the at least two corresponding images, identify a gunshot location. The processor device is further configured to transmit a gunshot location identifier that identifies the gunshot location to a destination.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Law enforcement and other first responders seek ways to respond more promptly and effectively to mass shootings and other gun-related violence. Many active shooter incidents are over relatively quickly, and reducing the time it takes to alert authorities about an active shooter incident may save lives. A source of delay in generating alerts to such incidents is reliance on human action both in the origination of an alert and in communicating the alert and other information about an incident. There is interest in systems that can accurately identify a gunshot and automatically generate notifications without human involvement.

Figure 1:
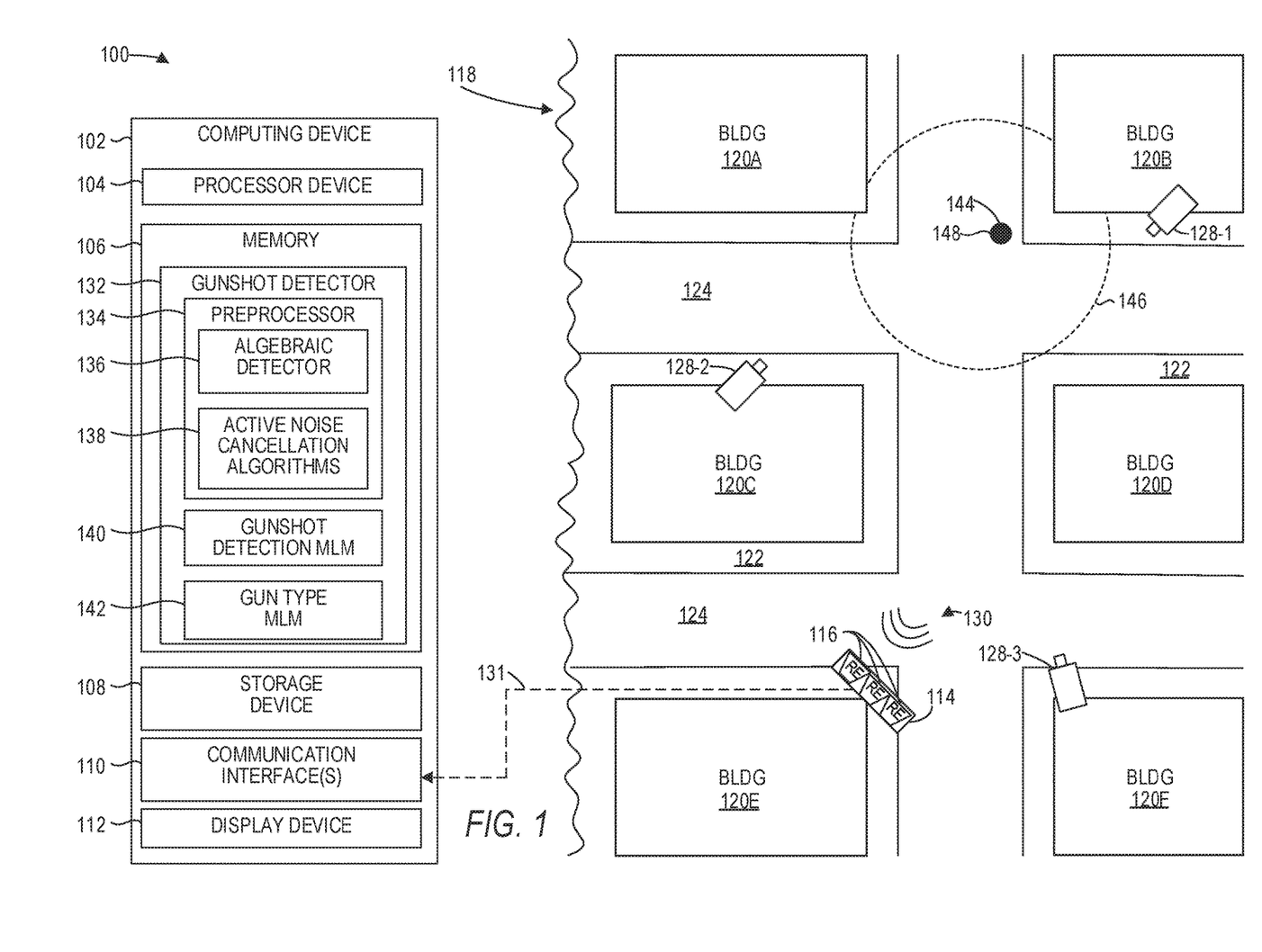
FIG. 1 is block diagram of a gunshot detection system suitable for real-time gunshot detection and reporting according to one embodiment.

The embodiments disclosed herein include methods and systems for detecting and reporting gunshot incidents. FIG. 1 is a block diagram of a gunshot detection system 100 suitable for real-time gunshot detection and reporting according to one embodiment. The gunshot detection system 100 includes a computing device 102. The computing device 102 includes a processor device 104, a memory 106, a storage device 108, a communication interface 110, and a display device 112.

The computing device 102 is communicatively coupled to one or more audio receivers 114, each of which includes a plurality of audio receiving elements 116. Each audio receiver 114 is located at a known location, and the audio receiving elements 116 comprise components configured to capture audio signals. In some embodiments, the audio receiving elements 116 comprise microphones. In some embodiments, the audio receiver 114 comprises a far-field microphone array (FFMA). While for purposes of illustration only three audio receiving elements 116 are illustrated, the audio receiver 114 may include any number of audio receiving elements 116. The audio receiver 114 is mounted in an urban setting 118, which, in this example, includes a plurality of buildings 120A-120F, sidewalks 122, and streets 124. In this example, the audio receiver 114 is mounted to the building 120E. While for purposes of illustration only a single audio receiver 114 is illustrated, in other embodiments the gunshot detection system 100 may include a plurality of audio receivers 114 mounted in various locations of the urban setting 118.

The gunshot detection system 100 also includes a plurality of cameras 128-1-128-3 (generally, cameras 128). The cameras 128-1-128-3 are positioned at known locations and are communicatively coupled to the computing device 102. In this example, the cameras 128-1-128-3 are mounted to buildings 120B, 120C, and 120F, respectively. While only three cameras 128 are illustrated, the gunshot detection system 100 may include any number of cameras 128. Moreover, while the gunshot detection system 100 is discussed herein with respect to an urban setting, the embodiments have applicability to outdoor and indoor environments, such as, by way of non-limiting example, a shopping mall, a sports stadium, an office building, a convention center, or the like.

The audio receiver 114 continually listens to ambient sounds 130 that are generated in the urban setting 118. The ambient sounds 130 comprise a mixture of urban sounds, such as sounds of vehicles, individuals, birds, and the like. The audio receiver 114 generates, based on the ambient sounds 130, an audio signal 131, and continually provides the audio signal 131 to the computing device 102. The audio signal 131 may comprise, for example, a digitized stream of data that identifies the sounds picked up by each audio receiving element 116, along with timestamps that identify times at which sounds were picked up by each audio receiving element 116. A gunshot detector 132 continuously, in real-time, analyzes the audio signal 131 to identify gunshots in the urban setting 118. In particular, the gunshot detector 132 may pre-process the audio signal 131 utilizing a preprocessor 134. In some embodiments, the preprocessor 134 comprises an algebraic detector (AD) 136 and/or active noise cancellation algorithms 138. The gunshot detector 132 may then analyze the pre-processed audio signal via a gunshot detection machine-learned model 140 that has been trained utilizing gunshots in urban settings. The gunshot detection machine-learned model 140 may comprise any suitable machine learned model, such as a neural network, or the like. In some embodiments, if the gunshot detector 132 determines that a gunshot has occurred, the gunshot detector 132 may analyze the audio signal 131 with a gun type machine-learned model 142 that has been trained utilizing gunshots in urban settings and with gun type identifiers that identify the types of guns that make the gunshots.

For purposes of illustrating real-time gunshot detection and reporting according to one embodiment, assume that an individual fires a weapon at a location 144 in the urban setting 118. The audio receiver 114 receives the ambient sounds 130, and generates and communicates the audio signal 131 to the computing device 102. The computing device 102 detects the gunshot in the audio signal 131. The computing device 102 determines, based on the audio receiving elements 116, an audio location 146 of the gunshot. The computing device 102 sends control signals to at least two of the cameras 128 to cause the cameras 128 to capture at least two corresponding images of the audio location 146. The cameras 128 provide the images to the computing device 102, and the computing device 102 analyzes the images and identifies a gunshot location 148. The computing device 102 transmits a gunshot location identifier, such as GPS coordinates or the like, to a destination, such as a law enforcement computing device, an emergency call center, or the like.

It is noted that because the gunshot detector 132 is a component of the computing device 102, functionality implemented by the gunshot detector 132 may be attributed to the computing device 102 generally. Moreover, in examples where the gunshot detector 132 comprises software instructions that program the processor device 104 to carry out functionality discussed herein, functionality implemented by the gunshot detector 132 may be attributed herein to the processor device 104.

Figure 2:
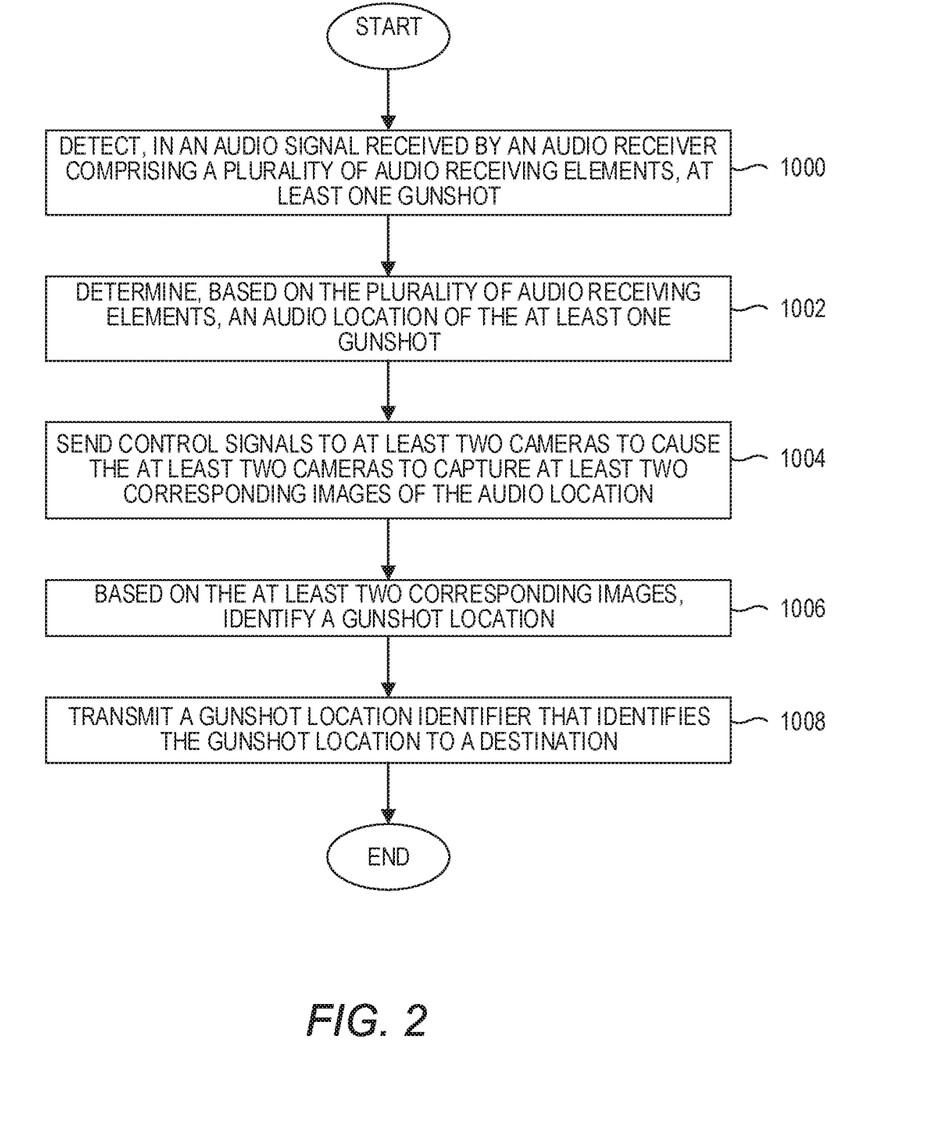
FIG. 2 is a flowchart illustrating a method for real-time gunshot detection and reporting according to one embodiment.

FIG. 2 is a flowchart illustrating a method for real-time gunshot detection and reporting according to one embodiment. FIG. 2 will be discussed in conjunction with FIG. 1. The computing device 102 receives the audio signal 131 generated by the audio receiver 114 based on the ambient sounds 130 (FIG. 2, block 1000). The computing device 102 analyzes the audio signal 131 for spikes in the audio temporal domain (e.g., increases in amplitude having a duration of less than 250-300 milliseconds (ms)). Spikes and spike-like behavior in the audio signal 131 are indicative of a gunshot sound. In particular, the AD 136 detects such spikes. As an example, the AD 136 may be an analytic expression that satisfies the following equation:

$$f_k^{b^2}(s^2\hat{X}_b(s))^{(2)} + 2f_k^b(s^2\hat{X}_b(s))^{(3)} + (s^2\hat{X}_b(s))^{(4)} = 0$$

where "f" is the firing time and "s" indicates samples from the time domain.

In response to a spike or spike-like behavior found in the audio signal 131 by the AD 136, the computing device 102 may then apply the active noise cancellation (ANC) algorithm 138. The ANC algorithm 138 dilutes or actively cancels out white noise and ambient noises in the audio signal 131 that do not exhibit the behavior of gunshot sounds. The ANC algorithm 138 enhances the spikes detected by the AD 136. In this manner, the AD 136 and ANC algorithm 138 refine the audio signal 131 for further analysis.

The computing device 102 may then process the pre-processed audio signal 131 with the gunshot detection machine-learned model 140. The gunshot detection machine-learned model 140 receives the pre-processed audio signal 131 as input, and generates an output that indicates a probability that the pre-processed audio signal 131 contains a gunshot sound. The computing device 102 may determine that, if the probability exceeds a probability threshold, such as 75%, 80%, 90%, or any other suitable threshold, a gunshot has been detected. In some embodiments, the computing device 102 may include additional conditions prior to determining that a gunshot has been detected, such as a number of gunshots within a predetermined period of time, such as two gunshots within 2 seconds, three gun shots within 2 seconds, or the like, before the computing device 102 determines that a gunshot has been detected in the audio signal 131.

Assuming that the computing device 102 determines that a gunshot has been detected in the audio signal 131 (FIG. 2, block 1000), the computing device 102 determines, based on the plurality of audio receiving elements 116, the audio location 146 of the gunshot (FIG. 2, block 1002). The determination may involve, for example, the use of triangulation based on the locations of the audio receiving elements 116, and differences in time of receipt of the ambient sounds 130 by the different audio receiving elements 116. For example, the audio receiver 114 may track the respective times of arrival of sound events in the ambient sounds 130 at each of the audio receiving elements 116, and add timestamp information to audio information sent to the computing device 102 in association with the audio signal 131. The computing device 102 may utilize direction of arrival (DoA) algorithms and/or angle of arrival (AoA) algorithms to analyze differences in the timestamping information to determine the audio location 146 of the gunshot sound.

The computing device 102, based on the audio location 146, sends control signals to at least two cameras 128 to cause the at least two cameras 128 to capture at least two corresponding images of the audio location 146 (FIG. 2, block 1004). In one embodiment, the computing device 102 accesses information that identifies the locations and orientations of the cameras 128. The cameras 128 may be fixed, may be movable (e.g., pan, tilt, zoom (PTZ) cameras), or may be or a combination of fixed and PTZ cameras. Based on the audio location 146, the computing device 102 identifies at least two cameras 128 that can capture an image of the audio location 146. The cameras 128 may be fixed and may be oriented such that the audio location 146 is within a field of view (FOV) of the cameras 128, or the cameras 128 may be PTZ cameras that can be instructed to pan, tilt and/or zoom, such that the audio location 146 is within a field of view of the cameras 128. In some embodiments, the zoom may be calibrated based on a Received Signal Strength Indicator (RSSI) of the audio signals 131 to estimate how far a location of the shooting is from the respective camera 128 and the audio receiver 114.

The computing device 102 may send control signals to the cameras 128 to capture images, either still images or video images, of the audio location 146, and provide the images to the computing device 102. In some embodiments, the cameras 128 include storage and may be continually recording video imagery of the scene within the FOV of the respective cameras 128. In such embodiments, the computing device 102 may determine that a camera 128 was already oriented toward the audio location 146 at the time of the gunshot, and the computing device 102 may direct the camera 128 to provide a previous amount of recorded video to the computing device 102, such as the previous 5 seconds, 10 seconds, 20 seconds, or the like.

In response to the control signals, each of the cameras 128 captures an image depicting the audio location 146. The computing device 102 processes the multiple images to identify the gunshot location 148 (FIG. 2, block 1006). The computing device 102 transmits a gunshot location identifier that identifies the gunshot location 148 to a destination (FIG. 2, block 1008). The gunshot location identifier may comprise any suitable information that informs responders of the gunshot location 148, such as GPS coordinates, an address of a nearest building, or the like.

Figure 3:
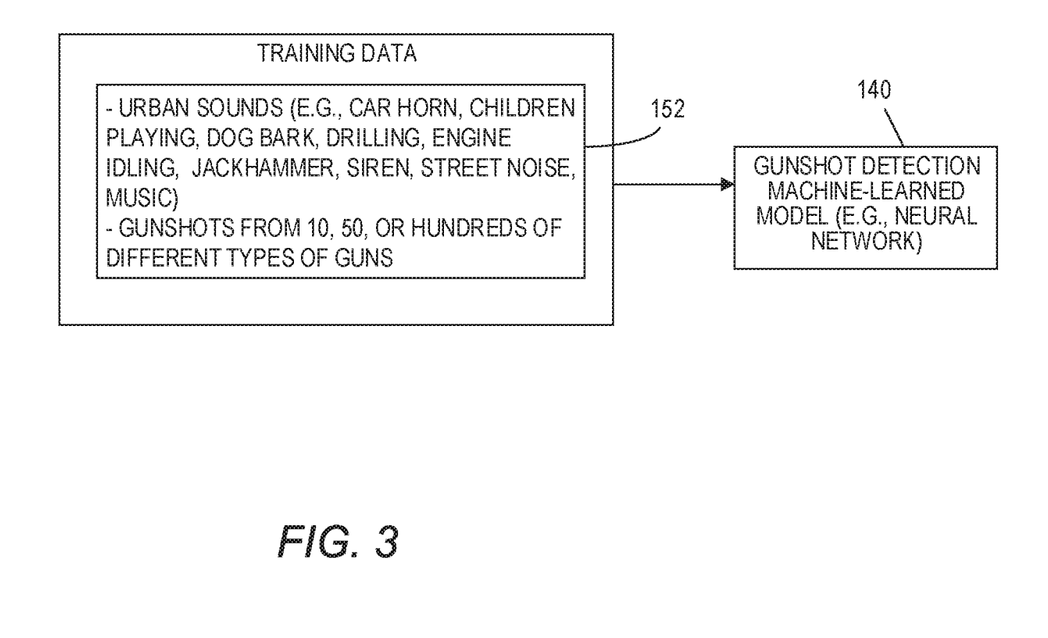
FIG. 3 is a block diagram of a process for training a gunshot detection machine-learned model according to one embodiment.

FIG. 3 is a block diagram of a process for training the gunshot detection machine-learned model 140 according to one embodiment. The training process involves training the gunshot detection machine-learned model 140 with an audio library 152 of a plurality of sounds of gunshots and urban sounds found an in urban environment, such as automobile horn sounds, sounds of children playing, dogs barking, drilling, engines of vehicles idling and/or accelerating, jack hammers, sirens, street noise, music, and the like. The gunshot sounds may, for example, comprise gunshots from the 10, 50, or 100 most often used guns in gun shooting incidents.

The combination of the preprocessor 134 (FIG. 1) and the gunshot detection machine-learned model 140 results in highly accurate gunshot detection. In tests performed utilizing the preprocessor 134 and the gunshot detection machine-learned model 140, the following results were achieved:

|  | 1D CNN | 2D CNN (64) | 2D CNN (128) | CNN Ensemble |
| --- | --- | --- | --- | --- |
| Accuracy | 99.4% | 99.4% | 99.4% | 99.5% |
| Precision | 98.0% | 97.1% | 97.4% | 97.9% |

Due to the high accuracy of gunshot detection, the gunshot detection system 100 eliminates the need for humans to analyze the sounds prior to reporting the gunshot location to emergency responders.

Figure 4:
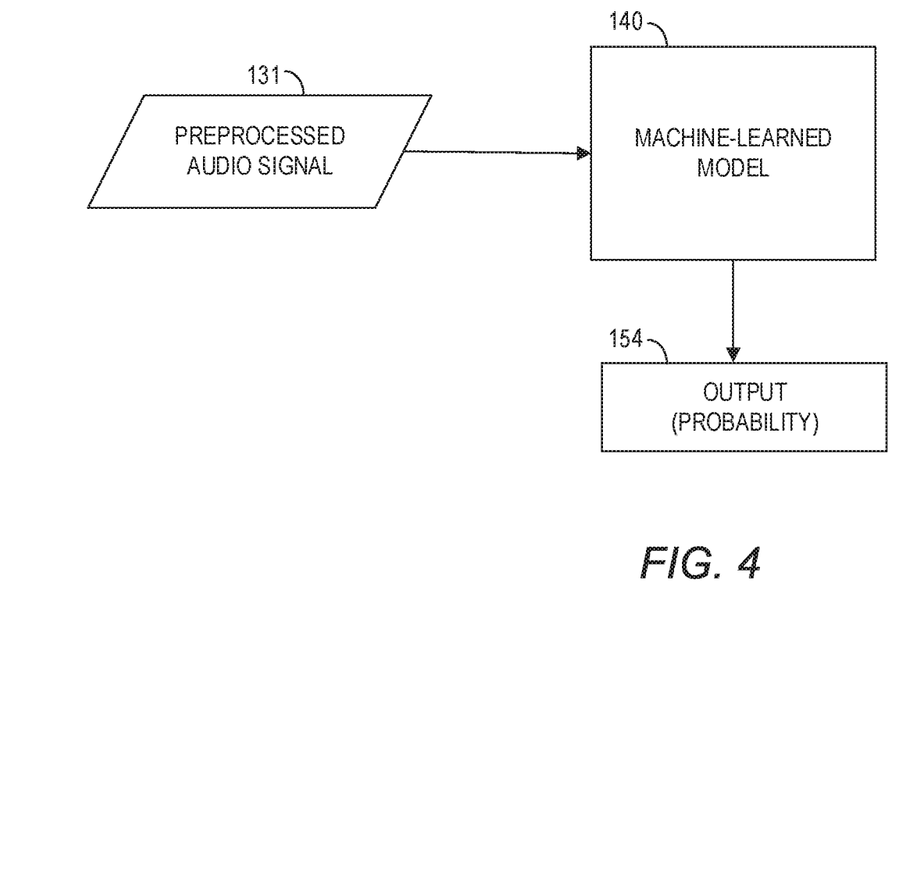
FIG. 4 is a block diagram illustrating the gunshot detection machine-learned model in operation according to one embodiment.

FIG. 4 is a block diagram illustrating the gunshot detection machine-learned model 140 in operation according to one embodiment. The gunshot detection machine-learned model 140 receives, as input, the preprocessed audio signal 131. As discussed above with regard to FIG. 3, the gunshot detection machine-learned model 140 has been trained using a plurality of different urban sounds and a plurality of different gunshot sounds corresponding to a plurality of different guns. The gunshot detection machine-learned model 140 processes the preprocessed audio signal 131, and outputs an indication, in the form of a probability 154, that the audio signal 131 contains a gunshot.

As discussed above, in some embodiments, the computing device 102 may not identify a single gunshot sound, and may require that a certain number of gunshot sounds be detected within a predetermined period of time. In some embodiments, the computing device 102 may determine a rate of fire based on a number of gunshots within a predetermined period of time and may include rate of fire information in a notification or message that includes the gunshot location identifier.

Figure 5:
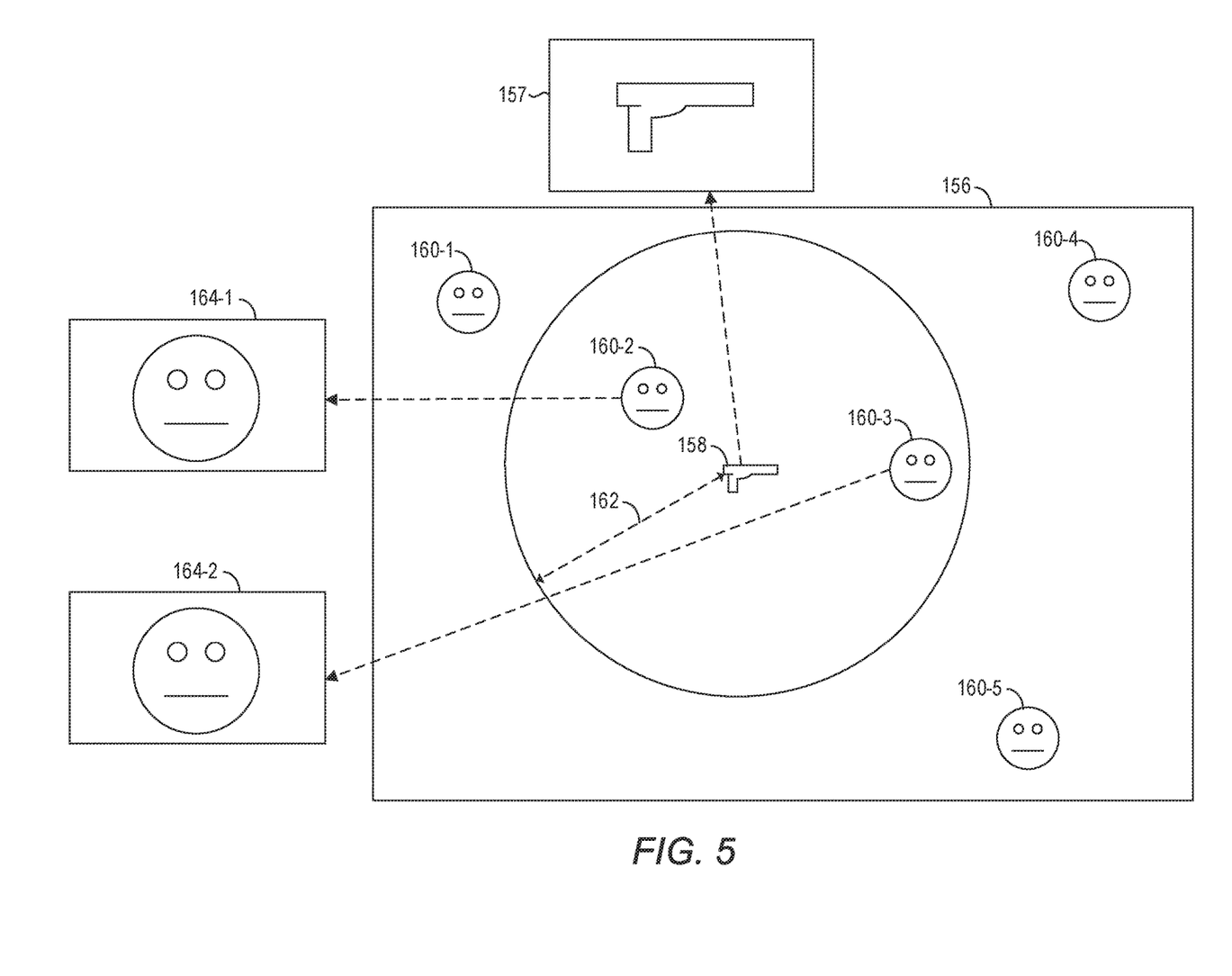
FIG. 5 is a diagram illustrating certain image analysis that may be undertaken by a computing device according to some embodiments.

FIG. 5 is a diagram illustrating certain image analyses that may be undertaken by the computing device 102 according to some embodiments. In this embodiment, the computing device 102 analyzes one or both of the images provided by the cameras 128. In some embodiments, the computing device 102 may generate a composite image of the scenes captured by the cameras 128; in other embodiments the computing device 102 may utilize a particular image captured by a camera 128 based on some criteria. The computing device 102 analyzes an image 156 to identify a gun 158 in the image 156. The computing device 102 may extract, from the image 156, a gun image 157 that depicts the gun 158. The computing device 102 may transmit the gun image 157 to the destination to provide emergency responders with visual information that depicts the weapon used to produce the gunshot.

In some embodiments, the computing device 102 may also analyze the image 156 to identify one or more faces 160-1-160-5 of individuals within a predetermined distance of the gun 158. For example, the computing device 102 may use facial detection analysis to determine that the faces 160-1-160-5 of the individuals are depicted in the image 156. The computing device 102 may then determine if any of the faces 160 are within a predetermined distance 162 of the gun 158, such as 0.5 meters, 1 meter, 3 meters, or the like. In this example, the computing device 102 determines that the faces 160-2 and 160-3 are within the predetermined distance 162 of the gun 158. The computing device 102 extracts, from the image 156, face images 164-1 and 164-2 of the faces 160-2 and 160-3, respectively. The computing device 102 may transmit the face images 164-1 and 164-2, along with information tagging the face image 164-1 as being nearest the gun, to the destination.

Figure 6:
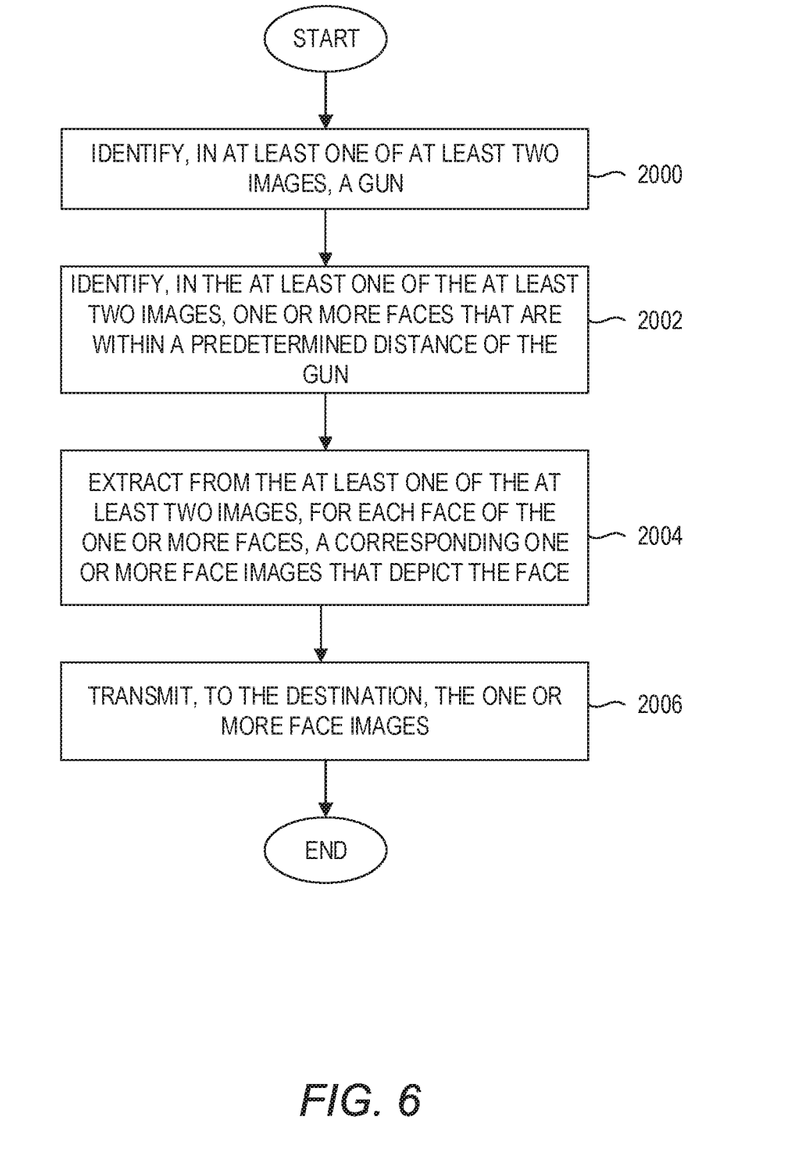
FIG. 6 is a flowchart illustrating a method for providing face images that depict faces of individuals in proximity of a gun according to one embodiment.

FIG. 6 is a flowchart illustrating a method for providing face images that depict faces of individuals in proximity of a gun according to one embodiment. FIG. 6 will be discussed in conjunction with FIG. 5. The computing device 102 identifies, in the image 156, the gun 158 (FIG. 6, block 2000). The computing device 102 identifies, in the image 156, the one or more faces 160-2, 160-3, that are within the predetermined distance 162 of the gun 158 (FIG. 6, block 2002). The computing device 102 extracts from the image 156, for each face 160-2, 160-3 of the one or more faces 160-2, 160-3, a corresponding one or more face images 164-1, 164-2 that depict the faces 160-2, 160-3 (FIG. 6, block 2004). The computing device 102 transmits, to the destination, the one or more face images 164-1, 164-2.

Figure 7:
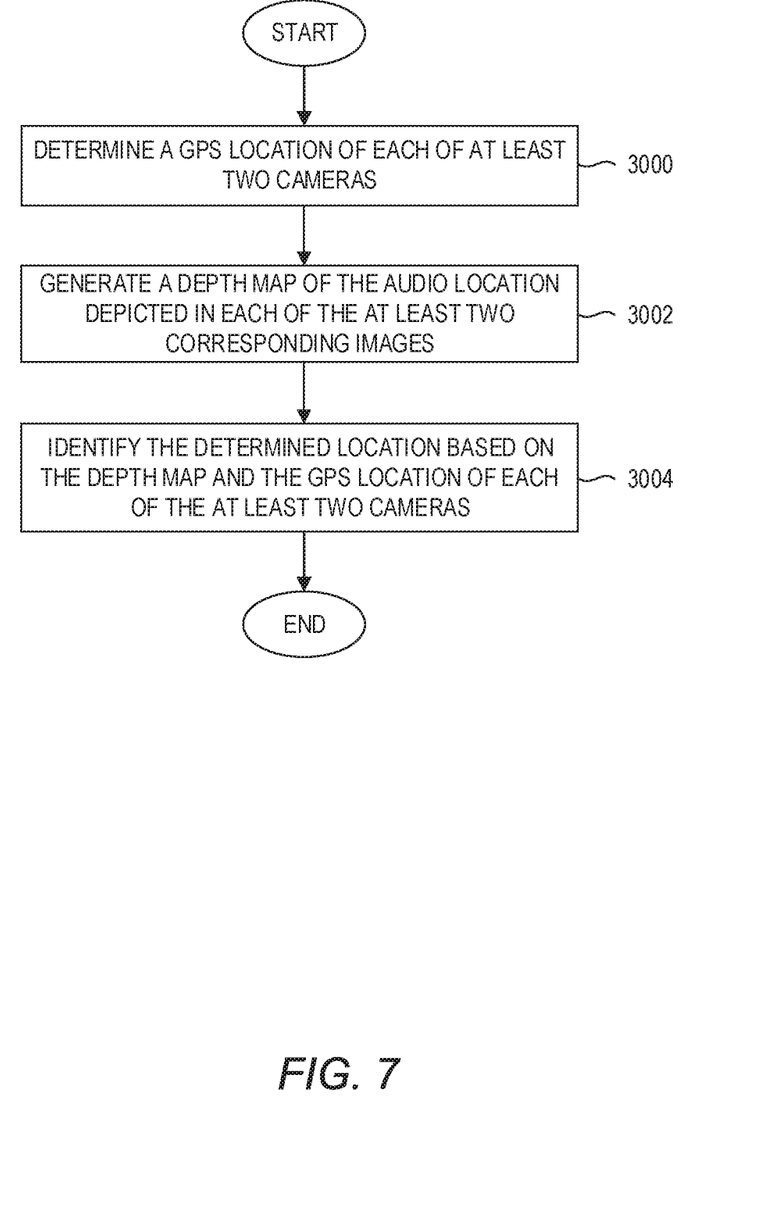
FIG. 7 is a flowchart of a method for determining a gunshot location from a plurality of images, according to one embodiment.

FIG. 7 is a flowchart of a method for determining a gunshot location from a plurality of images, according to one embodiment. As discussed above with regard to FIG. 1, the computing device 102 obtains, from a plurality of cameras 128, at least two images of the audio location 146. The computing device 102 determines, for each of the at least two cameras 128 that provided the images, a location of the respective cameras 128, such as GPS locations (FIG. 7, block 3000). The computing device 102 generates, based on the at least two images, a depth map of the audio location 146 (FIG. 7, block 3002). The depth map may include three-dimensional (3D) information that is derived from the at least two images. The computing device 102 may determine, based on the depth map, a distance to an object depicted in the images, such as a gun, from one of the at least two cameras 128. The computing device 102 identifies the gunshot location 148 based on the depth map and the GPS location of each of the at least two cameras 128 (FIG. 7, block 3004).

Figure 8:
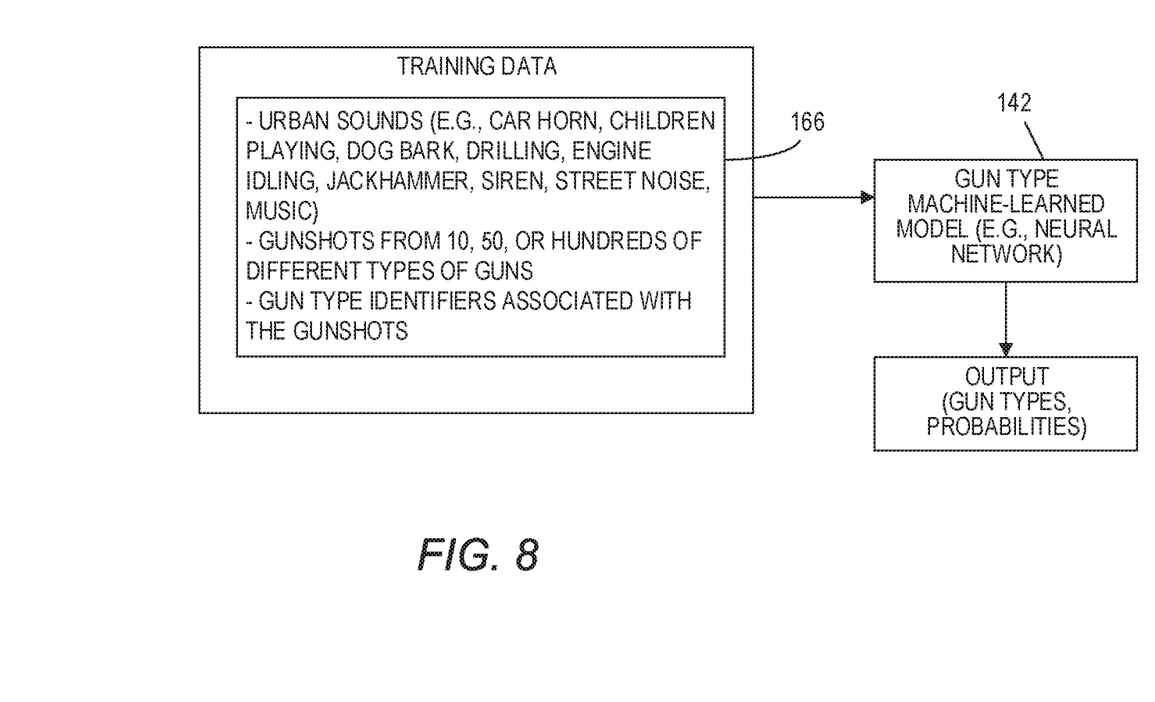
FIG. 8 is a block diagram of a process for training a gun type machine-learned model according to one embodiment.

FIG. 8 is a block diagram of a process for training the gun type machine-learned model 142 according to one embodiment. The process involves training the gun type machine-learned model 142 with an audio library 166 of a plurality of sounds of gunshots and urban sounds found an in urban environment, such as automobile horn sounds, sounds of children playing, dogs barking, drilling, engines of vehicles idling and/or accelerating, jack hammers, sirens, street noise, music, and the like. The gunshot sounds may, for example, comprise gunshots from the 10, 50 or 100 most often used guns in gun shooting incidents. The audio library 166 also includes gun type identifiers that identify the types of guns used to generate the gunshots.

After suitable training, the computing device 102 may utilize the gun type machine-learned model 142 to identify a gun type of a gun likely used to generate the detected gunshot. In particular, an audio snippet of the gunshot may be input into the gun type machine-learned model 142, and the gun type machine-learned model 142 outputs one or more gun types, along with corresponding probabilities that the gun types may be the gun used in the shooting incident. If a probability exceeds a predetermined threshold, the computing device 102 may transmit the gun type to the destination.

Figure 9:
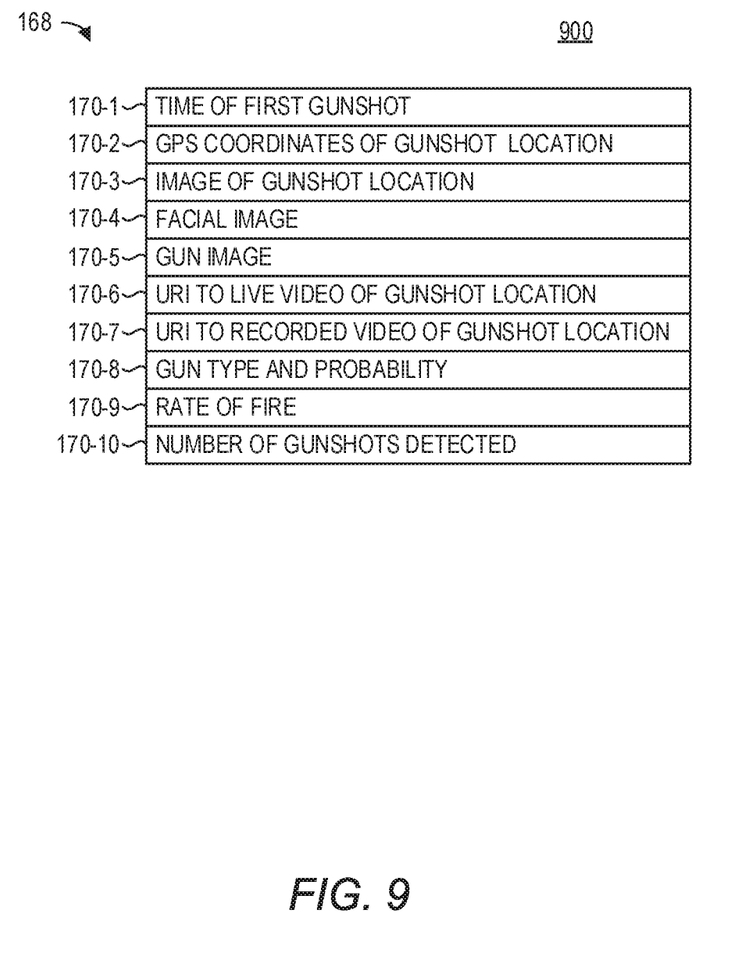
FIG. 9 is block diagram of a message format that may be used to provide the gunshot location and related information according to one embodiment.

FIG. 9 is block diagram of a message format 168 that may be used to provide the gunshot location and related information according to one embodiment. The message format 168 includes a timestamp field 170-1 that identifies a time that a gunshot was detected. A location field 170-2 identifies the gunshot location 148, such as, by way of non-limiting example, GPS coordinates, an address of a nearest building, an intersection of streets, or any other suitable information given the setting in which the gunshot detection system 100 is employed. A gunshot location image field 170-3 includes an image of the gunshot location 148. One or more facial image fields 170-4 include images of faces that were detected within a predetermined proximity of the gun. A gun image field 170-5 includes an image of the gun. A live video field 170-6 contains a uniform resource identifier (URI) or other link to a live video of one or more of the cameras 128 that are oriented towards the gunshot location 148. A recorded video field 170-7 contains a URI to a video recording of the gunshot location 148 if one of the cameras 128 recorded the gunshot location 148 at the time identified in the timestamp field 170-1. A gun type field 170-8 identifies a type of gun along with a probability. A rate of fire field 170-9 contains a rate of fire of the gun, if multiple gunshots were detected within a relatively short period of time. A number of gunshots field 170-10 identifies the number of gunshots that were detected.

The computing device 102 may generate a message having the message format 168 based on the analysis and actions described herein, and send a message to each of a plurality of destinations. The destinations may include, by way of non-limiting examples, telephone numbers, email addresses, IP addresses of computing devices, and the like. The exact message sent may be formatted based on the type of message sent, such as an email, an SMS message, or the like. The recipient receiving the message, such as an emergency responder, is instantly provided relevant information about the gunshot incident, and has the ability to select a link of a live video of the incident, even prior to arriving at the gunshot location.

Figure 10:
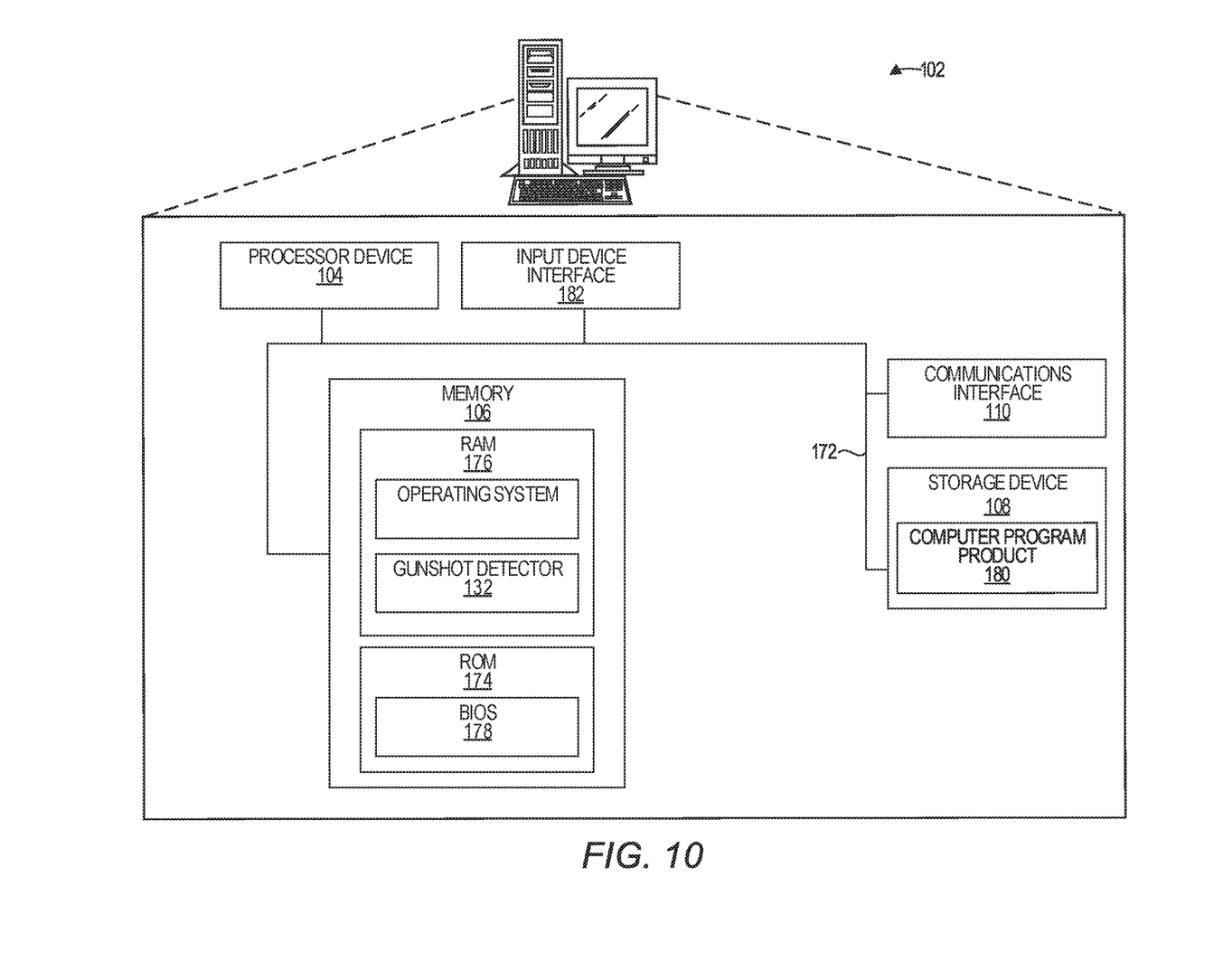
FIG. 10 is a block diagram of the computing device illustrated in FIG. 1 suitable for implementing examples herein, according to one example.

FIG. 10 is a block diagram of the computing device 102 according to one embodiment. The computing device 102 may comprise any computing or electronic device capable of including firmware, hardware, and/or executing software instructions to implement the functionality described herein, such as a computer server or the like. The computing device 102 includes the processor device 104, the memory 106, and a system bus 172. The system bus 172 provides an interface for system components including, but not limited to, the memory 106 and the processor device 104. The processor device 104 can be any commercially available or proprietary processor device.

The system bus 172 may be any of several types of bus structures that may further interconnect to a memory bus (with or without a memory controller), a peripheral bus, and/or a local bus using any of a variety of commercially available bus architectures. The memory 106 may include non-volatile memory 174 (e.g., read-only memory (ROM)), erasable programmable read-only memory (EPROM), electrically erasable programmable read-only memory (EEPROM), etc.), and volatile memory 176 (e.g., randomaccess memory (RAM)). A basic input/output system (BIOS) 178 may be stored in the non-volatile memory 174 and can include the basic routines that help to transfer information between elements within the computing device 102. The volatile memory 176 may also include a high-speed RAM, such as static RAM, for caching data.

The computing device 102 may further include or be coupled to a non-transitory computer-readable storage medium such as the storage device 108, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 108 and other drives associated with computer-readable media and computer-usable media may provide non-volatile storage of data, data structures, computer-executable instructions, and the like.

A number of modules can be stored in the storage device 108 and in the volatile memory 176, including an operating system and one or more program modules, such as the gunshot detector 132, which may implement the functionality described herein in whole or in part. All or a portion of the examples may be implemented as a computer program product 180 stored on a transitory or non-transitory computer-usable or computer-readable storage medium, such as the storage device 108, which includes complex programming instructions, such as complex computer-readable program code, to cause the processor device 104 to carry out the steps described herein. Thus, the computer-readable program code can comprise software instructions for implementing the functionality of the examples described herein when executed on the processor device 104.

An operator may also be able to enter one or more configuration commands through a keyboard, a pointing device such as a mouse (not illustrated), or a touch-sensitive surface such as a display device. Such input devices may be connected to the computing device 102 through an input device interface 182 coupled to the system bus 172 but can be connected through other communication interfaces such as a parallel port, an Institute of Electrical and Electronic Engineers (IEEE) 1394 serial port, a Universal Serial Bus (USB) port, an IR interface, and the like.

The computing device 102 may also include one or more communication interfaces 110, such as cellular, Wi-Fi, Ethernet, fiber, coaxial, or the like, to communicate with other devices including, for example, the cameras 128 and the audio receiver 114.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   detecting, in an audio signal received by an audio receiver comprising a plurality of audio receiving elements, at least one gunshot;
   determining, based on the plurality of audio receiving elements, an audio location of the at least one gunshot;
   identifying, based on the audio location and on information that identifies locations and orientations of a plurality of cameras, at least two cameras that can capture an image of the audio location;
   sending control signals to the at least two cameras to cause the at least two cameras to capture at least two corresponding images of the audio location;
   based on each of the at least two corresponding images, identifying a gunshot location; and
   transmitting a gunshot location identifier that identifies the gunshot location to a destination,
   wherein identifying the gunshot location further includes:
     determining a global positioning system (GPS) location of each of the at least two cameras;
     generating a depth map of the audio location depicted in each of the at least two corresponding images; and
     identifying the gunshot location based on the depth map and the GPS location of each of the at least two cameras.

2. The method of claim 1, wherein the gunshot location identifier comprises GPS coordinates.

3. The method of claim 1, further comprising:
   detecting, in at least one of the two corresponding images, a gun; and
   determining a location of the gun based on the depth map; and
   wherein the gunshot location comprises the location of the gun.

4. The method of claim 1, further comprising:
   detecting, in at least one of the two corresponding images, a gun;
   extracting, from the at least one of the two corresponding images, a gun image that depicts the gun; and
   transmitting, to the destination, the gun image.

5. The method of claim 1 wherein the detecting the at least one gunshot further comprises:
   inputting the audio signal into a gunshot detection machine-learned model that has been trained using a plurality of different urban sounds and a plurality of different gunshot sounds corresponding to a plurality of different guns; and
   receiving, from the gunshot detection machine-learned model, an indication that the audio signal comprises a gunshot.

6. The method of claim 1 wherein detecting the at least one gunshot further comprises:
   detecting, based on the audio signal, a plurality of gunshots;
   determining that the plurality of gunshots has occurred within a predetermined period of time; and
   wherein determining the audio location of the at least one gunshot comprises, in response to determining that the plurality of gunshots has occurred within the predetermined period of time, determining the audio location of the plurality of gunshots.

7. The method of claim 1 further comprising:
   analyzing the audio signal to identify a type of gun associated with the at least one gunshot; and
   transmitting, to the destination, a gun type identifier that identifies the type of gun.

8. The method of claim 7, wherein analyzing the audio signal to identify the type of gun further comprises:
   inputting the audio signal into a gun type machine-learned model that has been trained using a plurality of different urban sounds, a plurality of different gunshot sounds corresponding to a plurality of different guns, and a plurality of gun type identifiers that identify the plurality of different guns; and
   receiving, from the gun type machine-learned model, an output comprising the gun type identifier.

9. The method of claim 7 further comprising:
   detecting, based on the audio signal, a plurality of gunshots including the at least one gunshot;

determining, based on the plurality of gunshots, a rate of fire; and transmitting, to the destination, rate of fire information that identifies the rate of fire.

10. The method of claim 1 further comprising:

identifying, in at least one of the at least two corresponding images, a gun;

identifying, in the at least one of the at least two corresponding images, one or more faces that are within a predetermined distance of the gun;

extracting from the at least one of the at least two corresponding images, for each face of the one or more faces, a corresponding one or more face images that depict the face; and transmitting, to the destination, the one or more face images.

11. The method of claim 1 further comprising:

capturing, from at least one camera of the at least two cameras, an image of a setting of the audio location in a scene corresponding to the at least one camera of the at least two cameras; and transmitting, to the destination, the image.

12. The method of claim 1 further comprising:

capturing, from at least one camera of the at least two cameras, a video recording of a setting of the audio location in a scene corresponding to the at least one camera of the at least two cameras; and transmitting, to the destination, the video recording or a URI to the video recording.

13. A gunshot detection system, comprising:

a communications interface; and a processor device coupled to the communications interface and configured to:

detect, in an audio signal received by an audio receiver comprising a plurality of audio receiving elements, at least one gunshot;

determine, based on the plurality of audio receiving elements, an audio location of the at least one gunshot;

identify, based on the audio location and on information that identifies locations and orientations of a plurality of cameras, at least two cameras that can capture an image of the audio location;

send control signals to the at least two cameras to cause the at least two cameras to capture at least two corresponding images of the audio location;

based on each of the at least two corresponding images, identify a gunshot location; and transmit a gunshot location identifier that identifies the gunshot location to a destination, wherein identifying the gunshot location further includes:

determining a location of each of the at least two cameras;

generating a depth map of the audio location depicted in each of the at least two corresponding images; and identifying the gunshot location based on the depth map and the location of each of the at least two cameras.

14. The gunshot detection system of claim 13, wherein the processor device is further configured to:

detect, in at least one of the two corresponding images, a gun; and determine a location of the gun based on the depth map; and wherein the gunshot location comprises the location of the gun.

15. The gunshot detection system of claim 13, wherein the processor device is further configured to:

analyze the audio signal generated by the audio receiver to identify a type of a gun associated with the at least one gunshot; and transmit, to the destination, a gun type identifier that identifies the type of the gun.

16. The gunshot detection system of claim 13, wherein the processor device is further configured to:

identify, in at least one of the at least two corresponding images, a gun;

identify, in the at least one of the at least two corresponding images, one or more faces that are within a predetermined distance of the gun;

extract from the at least one of the at least two corresponding images, for each face of the one or more faces, a corresponding one or more face images that depicts the face; and transmit, to the destination, the one or more face images.

* * * * *